Figure 5:
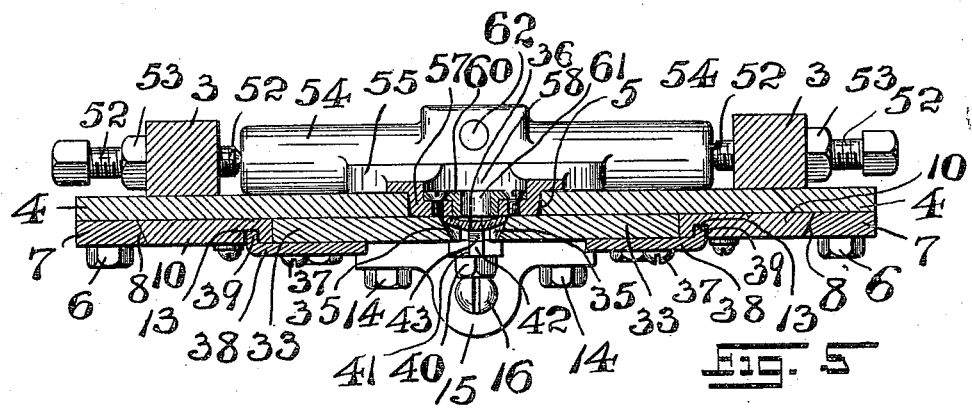

H. J. SKIPP.
HOLDING OR CLAMPING CHUCK FOR MACHINES FOR BORING AND NICHING THREAD HOLES IN BUTTON BLANKS.
APPLICATION FILED AUG. 4, 1910.
979,714.
Patented Dec. 27, 1910.
4 SHEETS—SHEET 1.
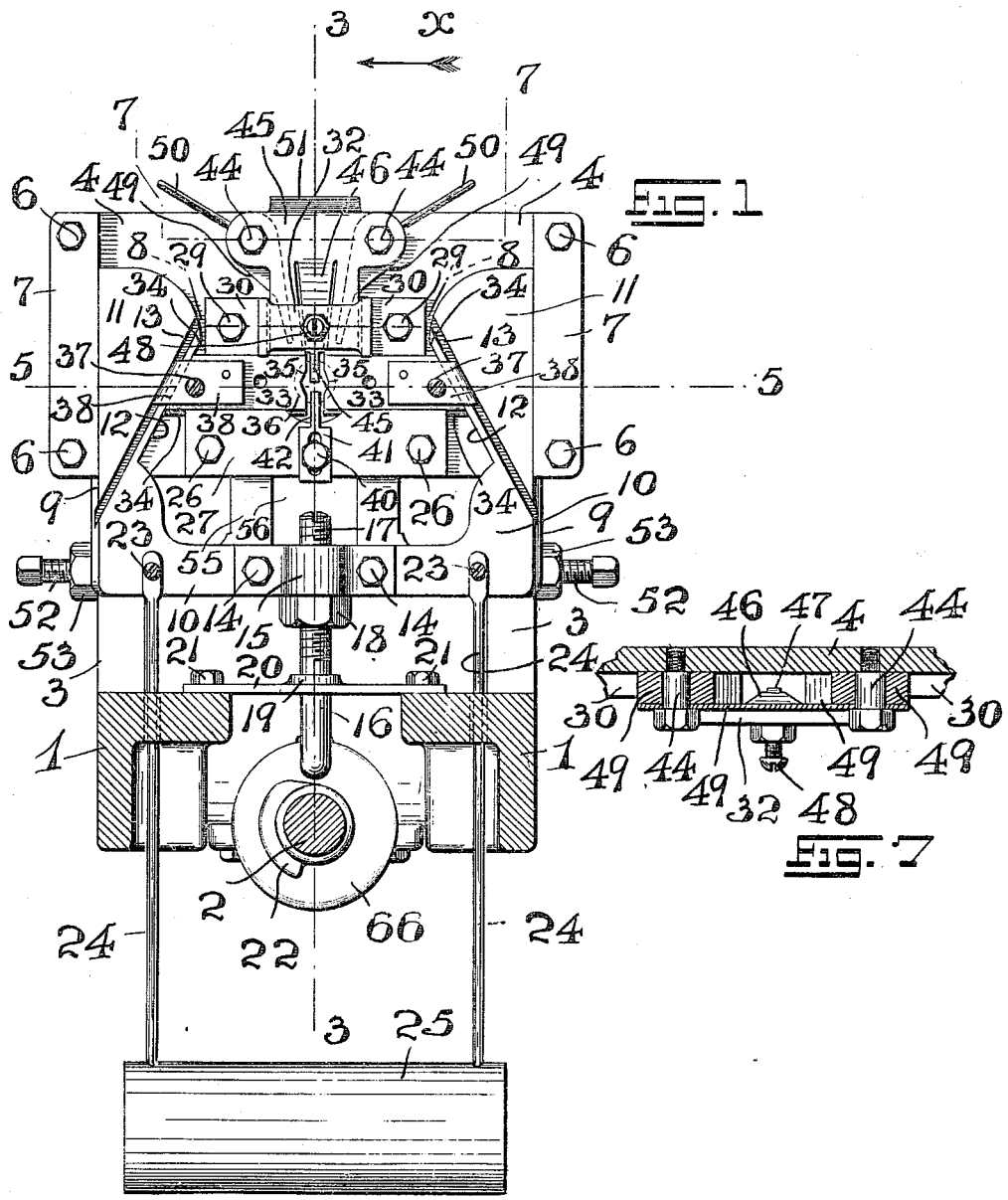
WITNESSES:
Fred'k H. W. Fraentzel
Anna J. H. Acker
INVENTOR:
Herbert J. Skipp,
BY
Fraentzel and Richards
ATTORNEYS

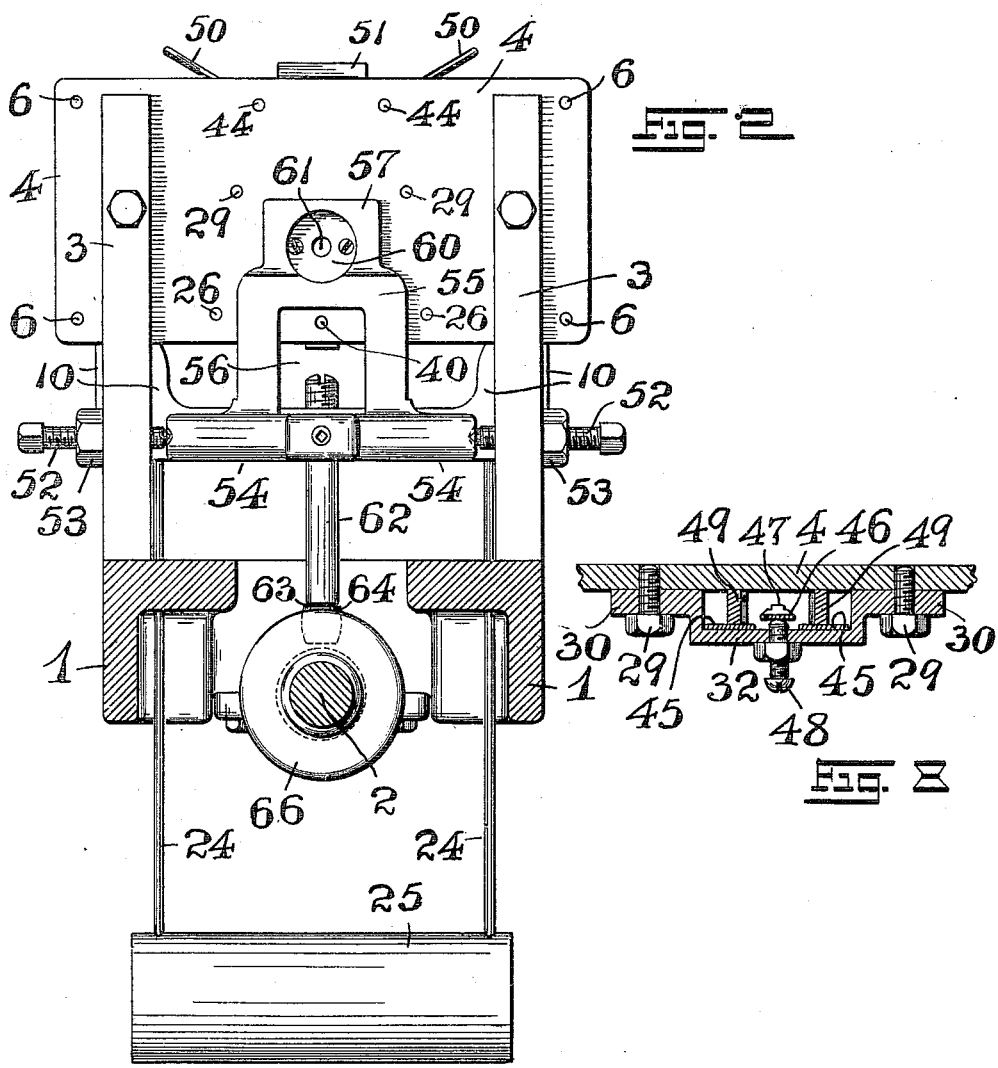

H. J. SKIPP.
HOLDING OR CLAMPING CHUCK FOR MACHINES FOR BORING AND NICHING THREAD HOLES IN BUTTON BLANKS.
APPLICATION FILED AUG. 4, 1910.
979,714.
Patented Dec. 27, 1910.
4 SHEETS—SHEET 3.
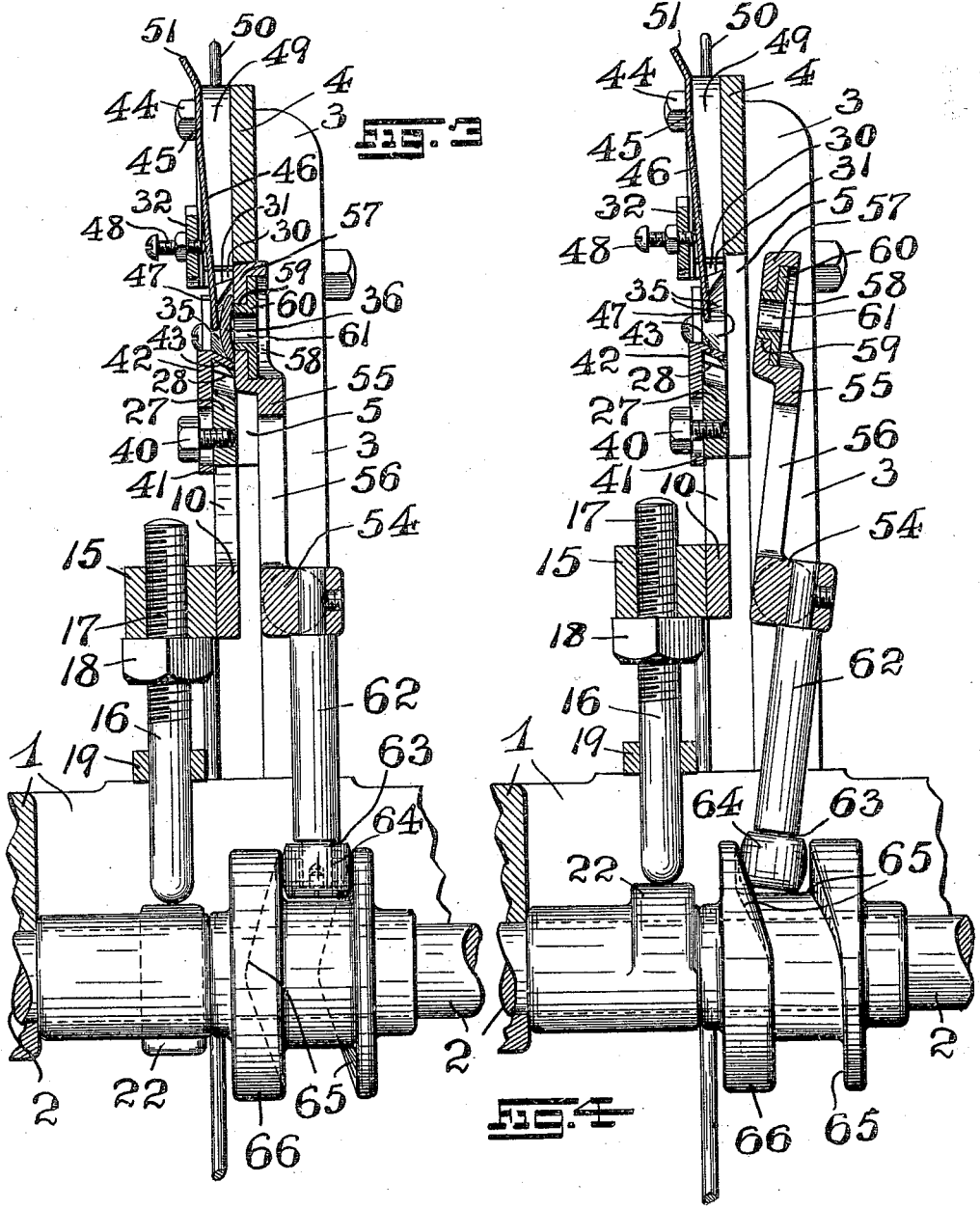
WITNESSES:
Fredk H. W. Fraentzel
Anna H. Alter
INVENTOR:
Herbert J. Skipp,
BY
Fraentzel and Richards,
ATTORNEYS H. J. SKIPP.
HOLDING OR CLAMPING CHUCK FOR MACHINES FOR BORING AND NICHING THREAD HOLES
IN BUTTON BLANKS.
APPLICATION FILED AUG. 4, 1910.

979,714.

Patented Dec. 27, 1910.
4 SHEETS—SHEET 4.

WITNESSES:
Fredk. H. W. Fraentzel
Anna H. Atter

INVENTOR:
Herbert J. Skipp,
BY
Fraentzel and Richards,
ATTORNEYS

UNITED STATES PATENT OFFICE.

HERBERT J. SKIPP, OF NEWARK, NEW JERSEY.

HOLDING OR CLAMPING CHUCK FOR MACHINES FOR BORING AND NICHING THREAD-HOLES IN BUTTON-BLANKS.

979,714.   Specification of Letters Patent.   Patented Dec. 27, 1910.

Application filed August 4, 1910. Serial No. 575,510.

*To all whom it may concern:*

Be it known that I, HERBERT J. SKIPP, a citizen of the United States, residing at Newark, in the county of Essex and State of New Jersey, have invented certain new and useful Improvements in Holding or Clamping Chucks for Machines for Boring and Niching Thread-Holes in Button-Blanks; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in machines for boring and niching thread-holes in button-blanks; and, the invention relates, more particularly, to a novel construction of automatically timed and operated holding or clamping chuck which is adapted to receive the button-blanks, to hold the same in a proper position, to present them to the drilling or boring elements of the machinery, so that the thread holes and niches may be bored and cut therein, and then to automatically release the button after such boring and niching operations have taken place.

The principal object of the present invention is to provide a simple, strong, and effective holding or clamping chuck for the purposes above set forth, the same being of comparatively few parts of simple mechanical operation, easily adjusted to adapt the same to hold or clamp various sized button-blanks, as desired, and the operative parts of which are moved and timed automatically to properly coact with the boring elements of the machine, and the same being driven and controlled directly from the main driving shaft of the button-boring machine.

Other objects of the present invention not at this time more particularly mentioned will be clearly understood from the following detailed description of the same.

With the various objects of the present invention in view, the same consists, primarily, in the novel holding or clamping chuck for button-boring machinery, and the like; and, the invention consists, furthermore, in the novel arrangements and combinations of the various devices and parts, as well as in the details of the construction of the same, all of which will be hereinafter more fully described, and then finally embodied in the clauses of the claim, which are appended to and which form an essential part of this specification.

The invention is clearly illustrated in the accompanying drawings, in which:—

Figure 6:
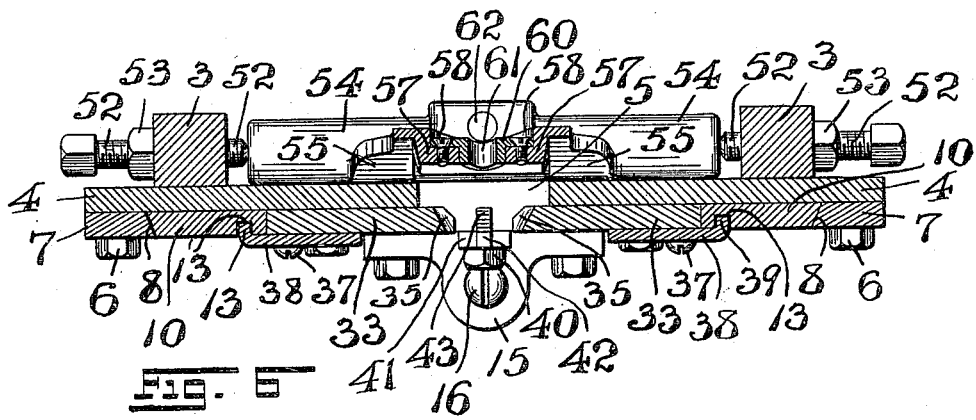

Figure 1 is a face view or front elevation of one side of said novel construction of button-blank holding or clamping chuck, the same being illustrated with reference to its relation to a portion of the frame-work, and the driving shaft of a button boring and niching machine. Fig. 2 is a similar face view of the opposite side of the said button-blank holding or clamping chuck. Fig. 3 is a vertical longitudinal cross section of the same, taken on line 3—3 in said Fig. 1, looking in the direction of the arrow *x*, the various parts of the clamping or holding mechanism being shown in their operative clamping or holding position with reference to a button-blank, the said view being drawn on a slightly enlarged scale. Fig. 4 is a view similar to that represented in said Fig. 3, but showing the various parts of said clamping or holding mechanism in their released position, whereby said button-blank is released from its held or clamped position in said chuck. Fig. 5 is a horizontal section, taken on line 5—5 in said Fig. 1 looking downwardly, the same showing the holding or clamping mechanism in its operative relation with a button-blank, said view being also drawn on a slightly enlarged scale. Fig. 6 is a view, similar to that shown in Fig. 5, but showing the various parts of said clamping or holding mechanism in their released positions, whereby said button-blank is released from its held or clamped position in said chuck. Fig. 7 is a detail horizontal section, taken on line 7—7 in said Fig. 1, looking in a downward direction; and, Fig. 8 is another detail horizontal section taken on line 8—8 in said Fig. 1, also looking in a downward direction.

Similar characters of reference are employed in all of the said above described views, to indicate corresponding parts.

Referring now to the several figures of said drawings, the reference-character 1 indicates a portion of the frame-work or bed of a button boring and niching machine, the same being provided with a main driving shaft 2 suitably journaled or mounted in connection therewith. Rigidly connected with and extending upwardly from said frame-work or bed 1 are a pair of posts 3, and secured to said posts 3, in any suitable manner, so as to be supported thereby, is a supporting plate 4, the same being provided with a cut-away portion or opening 5 extending upwardly from its lower horizontal edge, said cut-away portion being located in the central portion of said plate 4. Secured upon one side of said plate 4, and adjacent to each vertical marginal edge thereof, by means of bolts or screws, as 6, or any other suitable fastening means, are guide-plates 7, their inner or oppositely facing-edges being provided with an undercut or chamfer 8 adapted to form vertical guides in which is slidably arranged, by means of its correspondingly chamfered edges 9, a vertically movable plate 10. Said vertically movable plate 10 is formed with a pair of upwardly extending members 11, the same being each provided with a diagonal inner edge 12; and, adjacent thereto, they are each provided with grooves 13 which extend diagonally across the faces of said members 11 and parallel with their diagonal inner edges 12. The said diagonal edges 12 and grooves 13 of said members 11 slant or incline inwardly and upwardly from the outer edges of said members 11, substantially in the manner shown.

Secured to said vertically movable plate 10, by means of bolts or other fastening means 14, is a nut-piece 15. A rod 16, provided upon its upper end with a screw-thread 17, is screwed into the said nut-piece 15, and a nut 18 is arranged upon said rod 16 in order to lock the same in any desired vertically adjusted position with reference to said vertically movable plate 11, for the purpose subsequently to be disclosed. The said rod 16 passes through a yoke-piece 19 which forms a guide or bearing, said yoke-piece 19 being provided with oppositely extending arms 20 which serve to secure and support the same upon said frame-work or bed 1, through the agency of any desirable fastening means, such as bolts 21. The lower free end of said rod 16 engages with a cam-like member 22 which is secured upon said main driving shaft 2, and through the operation of which the said vertically moving plate 10 is operated so as to open and close suitable clamping or holding devices to be presently described. The said rod 16 is made adjustable in its relation with said vertically moving plate 10, so that the latter may be arranged to operate said clamping or holding devices for holding or clamping various sizes of button-blanks. Secured to the lower marginal edge of said vertically moving plate 10, by means of screws 23, or any other desirable fastening means, are a pair of downwardly extending rods 24, which pass through suitable openings in said frame-member or bed 1, and which are adapted to support a weight 25 secured in any suitable manner, to the lower free ends of said rods. The said weight 25 always tends to pull said vertically moving plate 10 downwardly, thus causing the same to present and maintain the rod 16 connected therewith in operative contact with said cam-like member 22.

Secured upon said supporting plate 4, preferably in a position parallel with the bottom-edge of said supporting plate 4, and by means of bolts 26, or the like, is a lower guide-plate 27. Said lower guide-plate 27 is provided upon its upper side edge with an undercut or chamfer 28. In a like manner, there is secured upon said supporting plate 4, by means of bolts 29, or the like, and parallel with said lower guide-plate 27 an upper guide-plate 30. Said upper guide-plate 30 is provided upon its lower side edge with an under-cut or chamfer 31, said upper guide-plate 30 being also provided with an outwardly extending or raised bridge-piece 32. Slidably arranged between said respective under-cut or chamfered edges 28 and 31 of said lower and upper guide-plates 27 and 30 are a pair of clamping plates 33, each of said plates 33 being provided with chamfered edges adapted to engage the above mentioned undercut or chamfered edges 28 and 31 of said lower and upper guide-plates 27 and 30. The inner ends of said clamping plates 33 are suitably cut and chamfered so as to provide holding or clamping jaws 35 adapted to engage with and hold the button-blank 36 in position. Secured upon the outer ends of said clamping plates 33, by means of screws 37, or the like, are link-plates 38, the free ends of said link-plates 38 being each provided with inwardly extending projections 39 adapted to conform to the slant of and penetrate into the said diagonal grooves 13 of said vertically moving plate 10.

Adjustably secured, by means of a screw or bolt 40, upon the face of said lower guide-plate 27, is the slotted body-portion 41 of an adjustable stop-lug 42 having an inwardly projecting finger 43 which serves to engage the lower edge of the button-blank 36, and to stop the same in a position opposite said holding or clamping jaws 35 of the clamping plates 33.

Secured so as to be supported upon said supporting plate 4 by means of bolts 44, or the like, is a chute-plate 45 which is provided with a downwardly extending spring-like member 46 having upon its lower end a tongue or lug 47 adapted to engage the back of the button-blank 36. Said spring-like member 46 passes beneath and under the bridge-piece 32 formed in connection with said upper guide-plate 30, and said spring-like member 46 is adapted to be properly adjusted to engage different thicknesses of button-blanks by means of a screw 48 which is arranged in said bridge-piece 32. Arranged between said supporting plate 4 and said chute-plate 45, and journaled upon said bolts 44, or the like, so as to oscillate thereon, are a pair of swinging guide-members 49 which extend downwardly toward said clamping plates 33, and tend to guide the button-blank between the clamping or holding jaws 35 thereof. Said guide-members 49 are each provided with suitably connected finger-pieces 50 for operating the same, in order to secure the desired adjustment thereof. Said chute-plate 45 is further provided with an upwardly extending tongue or extension 51 which serves as a means for connecting with said clamping or holding mechanism a suitable feed-chute for supplying or carrying the button-blanks thereto. The button-blanks, as they are delivered by means of a chute or the like, pass between said chute-plate 45 and said supporting plate 4, and between the swinging guide-members 49, to a proper position so as to be gripped and retained by said clamping or holding jaws 35 of said clamping plates 33. The said guide-members 49 are adjustable with relation to their relative positions, so as to permit the passage therebetween of different sizes of button-blanks.

Arranged in said posts 3 are a pair of pivot-screws 52, the same being provided with lock-nuts 53 to secure the same in their properly adjusted position. Journaled upon the free ends of said pivot-screws 52, so as to oscillate thereon, is a cross-bar 54, said cross-bar 54 being provided with an upwardly extending member 55 which is formed with a cut-out portion or opening 56. Connected with said upwardly extending member 55, at its upper free end, is a chuck-plate 57, said plate being arranged so as to dovetail or fit into said cutaway portion or opening 5 of said supporting plate 4, and said plate being further adapted to register centrally with said clamping or holding jaws 35 of said clamping-plates 33. Said chuck-plate 57 is also provided with a countersunk portion 58 and a centrally disposed hole or opening 59 in which is arranged a bushing 60 providing an opening 61 through which the boring and niching drills of the drilling mechanism may pass to operatively reach the button-blank 36 which is clamped or held in the clamping or holding devices hereinabove mentioned. Said cross-bar 54 is further provided with a downwardly extending arm 62 rigidly secured thereto, said arm being provided at its lower free end with a reduced portion forming a journal 63 upon which is mounted a roller 64. Said roller 64 is engaged by a cam-groove 65 of a cam-like member 66 secured upon said driving shaft 2, said cam-like member 66 serving to oscillate said arm 62 and the cross-bar 54 to move in and out of operative position said chuck-plate 57.

The operation of the clamping and holding devices herein-above described is as follows:—In the course of the operation of the boring or drilling machine, a button-blank, as 36, is fed from a suitable source of supply, by means of a chute or similar device, so that the same is caused to drop down between said guide-members 49 until the same is stopped by the finger 43 of said stop-lug 42. The cam-like member 66 is at this time in such a position that it operates to hold said chuck-plate 57 in its operative or holding position, illustrated in Figs. 3 and 5, so that said button-blank 36 rests against the inner face of said chuck-plate 57 and is in registration with the opening 61 of said bushing 60 carried thereby. At this time also the cam 22 is in engagement with said rod 16, so as to raise the same, which in turn raises said vertically moving plate 10, which, operating by means of its groove 13 in engagement with said link-plates 38, tends to slide outwardly said clamping plates 33 and thus separates the clamping or holding jaws 35, so that the button-blank 36 may drop therebetween. After said button-blank is thus in position, the high point of said cam 22 suddenly leaves its contact with said rod 16, thus permitting the weight 25 to pull downwardly upon said vertically moving plate 10, which tends to move said clamping plates one toward the other, owing to the reverse action of said diagonal grooves 13 and link-plates 38, so that said clamping or holding jaws 35 engage in clamping or gripping the periphery of said button-blank 36 and thereby force or wedge the same tightly against the face of the chuck-plate 57, thus holding the button-blank in readiness for the drilling or boring and niching operations. During the drilling or boring and niching operations, the cams 22 and cam-like member 66 have been revolving with said driving shaft 2, and by the time said operations are completed, the said cam 22 again engages said rod 16 and pushing upwardly thereon, again raises said vertically moving plate 10 and separates the said clamping jaws 35. Simultaneously with this opening of said clamping jaws 35, the said cam-like member 66 has presented its cam-groove 65 in such a position as to cause the same to act upon the roller 64 and arm 62 to oscillate said cross bar 54, which thereby carries outwardly and away from its holding position, the said chuck-plate 57, said plate assuming the position illustrated more particularly in Figs. 4 and 6 of the drawings. The button-blank 36, or, as it has thus become the finished button, is now released from its held position and drops by force of gravity out of said clamping or holding device into a suitable chute, or other means, which may be provided for its reception, as it falls away from said clamping or holding device. As soon as the button falls away, as above set forth, the cam-groove 65 of said cam-like member 66 continues to act upon said roller 64 and arm 62 to again oscillate said cross-bar 54 in the opposite direction to again carry said chuck-plate 57 back to its operatively closed position, and said clamping or holding device is again ready to receive another button-blank, for a repetition of the above-described operations. The said cam-like members 22 and 66 are respectively arranged upon and driven by said driving shaft 2 of the button-blank boring and niching machinery in such a manner as to properly time the operations of the clamping device and cause it to coact with the other elements and operative mechanism of the boring and niching machinery.

I am aware that changes may be made in the arrangements and combinations of the various devices and parts, as well as in the details of the construction of the same, without departing from the scope of the present invention, as described in the foregoing specification, and as defined in the claims which are appended thereto. Hence, I do not limit my invention to the exact arrangements and combinations of the parts as herein described and as illustrated in the accompanying drawings, nor do I confine myself to the exact details of the construction of the said parts.

I claim:

1. In a clamping chuck for button-blank drilling machinery, the combination with a supporting plate, of a vertically movable plate, a pair of clamping plates, means connecting said clamping plates with said vertically movable plate, so that the former are operated by the movement of the latter, a cam-like member connected with a driving shaft, means connected with said vertically movable plate adapted to be engaged by said cam-like member to raise said vertically movable plate, a weight connected with said vertically movable plate for lowering the same, a chuck-plate adapted to coact with said clamping plates in holding a button blank, and means for oscillating said chuck-plate to cause the same to move in and out of its operative holding position, substantially as and for the purposes set forth.

2. In a clamping chuck for button-blank drilling machinery, the combination with a supporting plate and posts for carrying the same, of a vertically movable plate, a pair of clamping plates, guide-plates for slidably supporting said clamping plates, means connecting said clamping plates with said vertically movable plate, so that the former are operated by the movement of the latter, a cam-like member connected with a driving shaft, means connected with said vertically movable plate adapted to be engaged by said cam-like member to raise said vertically movable plate, a weight connected with said vertically movable plate for lowering the same, a pivotally mounted chuck-plate adapted to coact with said clamping plates in holding a button-blank, and means for oscillating said chuck-plate to cause the same to move in and out of its operative holding position, substantially as and for the purposes set forth.

3. In a clamping chuck for button-blank drilling machinery, the combination with a supporting plate and posts for carrying the same, of a vertically movable plate, a pair of clamping plates, guide-plates for slidably supporting said clamping plates, means connecting said clamping plates with said vertically movable plate, so that the former are operated by the movement of the latter, a cam-like member connected with a driving shaft, means connected with said vertically movable plate adapted to be engaged by said cam-like member to raise said vertically movable plate, a weight connected with said vertically movable plate for lowering the same, a cross-bar pivotally supported between the posts of said supporting plate, an upwardly extending member connected with said cross-bar, a chuck-plate carried by said upwardly extending member, said chuck-plate being provided with an opening for the passage of drills therethrough, and means for oscillating said cross-bar to move said chuck-plate in and out of its coöperative holding relation with said clamping plates, substantially as and for the purposes set forth.

4. In a clamping chuck for button-blank drilling machinery, the combination with a supporting plate and posts for carrying the same, of a vertically movable plate, a pair of clamping plates, guide-plates for slidably supporting said clamping plates, means connecting said clamping plates with said vertically movable plate, so that the former are operated by the movement of the latter, a cam-like member connected with a driving shaft, means connected with said vertically movable plate adapted to be engaged by said cam-like member to raise said vertically movable plate, a weight connected with said vertically movable plate for lowering the same, a cross-bar pivotally supported between the posts of said supporting plate, an upwardly extending member connected with said cross-bar, a chuck-plate carried by said upwardly extending member, said chuck-plate being provided with an opening for the passage of drills therethrough, and means for oscillating said cross-bar to move said chuck-plate in and out of its coöperative holding relation with said clamping plates, comprising a cam-like member provided with a cam-groove a downwardly extending arm connected with said cross-bar, and a roller journaled upon the lower end of said arm and adapted to be engaged by said cam-groove of said cam-like member, substantially as and for the purposes set forth.

5. In a clamping chuck for button-blank drilling machinery, the combination with a supporting plate and posts for carrying the same, of a vertically movable plate, a pair of clamping plates provided with clamping jaws, plates for slidably supporting said clamping plates, means connecting said clamping plates with said vertically movable plate, so that the former are operated by the movement of the latter, a cam-like member connected with a driving-shaft, means connected with said vertically movable plate adapted to be engaged by said cam-like member to raise said vertically movable plate, a weight connected with said vertically movable plate for lowering the same, a pair of swinging guide-members arranged above said clamping plates adapted to guide a button-blank between the clamping jaws of said clamping-plates, a chute-plate arranged over said guide-members, said chute-plate being provided with a spring-like member having a tongue or lug adapted to engage the back of said button-blank, means for adjusting the position of said spring-like member, a stop-lug adjustably supported in connection with one of said guide-plates, said stop-lug having an inwardly projecting fingerpiece adapted to support the said button-blank, a pivotally mounted chuck-plate adapted to coact with said clamping plates and their clamping jaws in holding the button-blank, and means for oscillating said chuck-plate to cause the same to move in and out of its operative holding position, substantially as and for the purposes set forth.

6. In a clamping chuck for button-blank drilling machinery, the combination with a supporting plate and posts for carrying the same, of a vertically movable plate, a pair of clamping plates provided with clamping jaws, plates for slidably supporting said clamping plates, means connecting said clamping plates with said vertically movable plate, so that the former are operated by the movement of the latter, a cam-like member connected with a driving-shaft, means connected with said vertically movable plate adapted to be engaged by said cam-like member to raise said vertically movable plate, a weight connected with said vertically movable plate for lowering the same, a pair of swinging guide-members arranged above said clamping plates adapted to guide a button-blank between the clamping jaws of said clamping-plates, a chute-plate arranged over said guide-members, said chute-plate being provided with a spring-like member having a tongue or lug adapted to engage the back of said button-blank, means for adjusting the position of said spring-like member, a stop-lug adjustably supported in connection with one of said guide-plates, said stop-lug having an inwardly projecting fingerpiece adapted to support the said button-blank, a cross-bar pivotally supported between the posts of said supporting plate, an upwardly extending member connected with said cross-bar, a chuck-plate carried by said upwardly extending member, said chuck-plate being provided with an opening for the passage of drills therethrough, and means for oscillating said cross-bar to move said chuck-plate in and out of its coöperative holding relation with clamping plates, substantially as and for the purposes set forth.

7. In a clamping chuck for button-blank drilling machinery, the combination with a supporting plate and posts for carrying the same, of a vertically movable plate, a pair of clamping plates provided with clamping jaws, plates for slidably supporting said clamping plates, means connecting said clamping plates with said vertically movable plate, so that the former are operated by the movement of the latter, a cam-like member connected with a driving-shaft, means connected with said vertically movable plate adapted to be engaged by said cam-like member to raise said vertically movable plate, a weight connected with said vertically movable plate for lowering the same, a pair of swinging guide-members arranged above said clamping plates, adapted to guide a button-blank between the clamping jaws of said clamping plates, a chute-plate arranged over said guide-members, said chute-plate being provided with a spring-like member having a tongue or lug adapted to engage the back of said button-blank, means for adjusting the position of said spring-like member, a stop-lug adjustably supported in connection with one of said guide-plates, said stop-lug having an inwardly projecting fingerpiece adapted to support the said button-blank, a cross-bar pivotally supported between the posts of said supporting plate, an upwardly extending member connected with said cross-bar, a chuck-plate carried by said upwardly extending member, said chuck-plate being provided with an opening for the passage of drills therethrough, and means for oscillating said cross-bar to move said chuck-plate in and out of its coöperative holding relation with said clamping plates, comprising a cam-like member provided with a cam-groove, a downwardly extending arm connected with said cross-bar, and a roller journaled upon the lower end of said arm and adapted to be engaged by said cam-groove of said cam-like member, substantially as and for the purposes set forth.

8. In a clamping chuck for button-blank drilling machinery, the combination with a supporting plate and posts for carrying the same, of a vertically movable plate, guide-plates connected with said supporting plate for slidably supporting said vertically movable plate, a pair of upwardly extending members connected with said vertically movable plate, said upwardly extending members being provided with diagonal grooves parallel to the inner edges of said upwardly extending members, a pair of clamping plates provided with clamping jaws, guide-plates for slidably supporting said clamping plates, a link-plate connected with said clamping plates and adapted to operatively engage with the respective diagonal grooves of said upwardly extending members, a nut-piece secured to said vertically movable plate, a downwardly extending rod adjustably connected with said nut-piece, a cam-like member connected with a driving shaft, said cam-like member being adapted to engage said rod to move upwardly said vertically movable plate, a pair of downwardly depending arms connected with said vertically movable plate, a weight connected with the lower end of said arms, said weight being adapted to lower the said vertically movable plate, a pivotally mounted chuck-plate adapted to coact with said clamping plates and their holding jaws in holding the button-blank, and means for oscillating said chuck-plate to cause the same to move in and out of its operative holding position, substantially as and for the purposes set forth.

9. In a clamping chuck for button-blank drilling machinery, the combination with a supporting plate and posts for carrying the same, of a vertically movable plate, guide-plates connected with said supporting plate for slidably supporting said vertically movable plate, a pair of upwardly extending members connected with said vertically movable plate, said upwardly extending members being provided with diagonal grooves parallel to the inner edges of said upwardly extending members, a pair of clamping plates provided with clamping jaws, guide-plates for slidably supporting said clamping plates, a link-plate connected with said clamping plates and adapted to operatively engage with the respective diagonal grooves of said upwardly extending members, a nut-piece secured to said vertically movable plate, a downwardly extending rod adjustably connected with said nut-piece, a cam-like member connected with a driving shaft, said cam-like member being adapted to engage said rod to move upwardly said vertically movable plate, a pair of downwardly depending arms connected with said vertically movable plate, a weight connected with the lower ends of said arms, said weight being adapted to lower the said vertically movable plate, a cross-bar pivotally supported between the posts of said supporting plate, an upwardly extending member connected with said cross-bar, a chuck-plate carried by said upwardly extending member, said chuck-plate being provided with an opening for the passage of drills therethrough, and means for oscillating said cross-bar to move said chuck-plate in and out of its coöperative holding relation with said clamping plates, comprising a cam-like member provided with a cam-groove, a downwardly extending arm connected with said cross-bar, and a roller journaled upon the lower end of said arm and adapted to be engaged by said cam-groove of said cam-like member, substantially as and for the purposes set forth.

10. In a clamping chuck for button-blank drilling machinery, the combination with a supporting plate and posts for carrying the same, of a vertically movable plate, guide-plates connected with said supporting plate for slidably supporting said vertically movable plate, a pair of upwardly extending members connected with said vertically movable plate, said upwardly extending members being provided with diagonal grooves parallel to the inner edges of said upwardly extending members, a pair of clamping plates provided with clamping jaws, guide-plates for slidably supporting said clamping plates, a link-plate connected with said clamping plates and adapted to operatively engage with the respective diagonal grooves of said upwardly extending members, a nut-piece secured to said vertically movable plate, a downwardly extending rod adjustably connected with said nut-piece, a cam-like member connected with a driving shaft, said cam-like member being adapted to engage said rod to move upwardly said vertically movable plate, a pair of downwardly depending arms connected with said vertically movable plate, a weight connected with the lower ends of said arm, said weight being adapted to lower the said vertically movable plate, a pair of swinging guide-members arranged above said clamping plates, said guide-members being adapted to guide a button-blank between the said clamping jaws of said clamping plates, a chute-plate arranged in connection with said guide-members, said chute-plate being provided with a spring-like member provided at its lower end with a tongue adapted to engage the back of said button-blank, a bridge-piece connected with one of the guide-plates over said clamping plates, an adjusting screw carried by said bridge-piece for adjusting the position of said spring-like member and its tongue, a stop-lug adjustably connected with either of said guide-plates over said clamping plates, said stop-lug having an inwardly projecting fingerpiece which serves to stop and support said button-blank between the clamping jaws and said clamping plates, a pivotally mounted chuck-plate adapted to coact with said clamping plates in holding a button-blank, and means for oscillating said chuck-plate to cause the same to move in and out of its operative holding position, substantially as and for the purposes set forth.

11. In a clamping chuck for button-blank drilling machinery, the combination with a supporting plate and posts for carrying the same, of a vertically movable plate, guide-plates connected with said supporting plate for slidably supporting said vertically movable plate, a pair of upwardly extending members connected with said vertically movable plate, said upwardly extending members being provided with diagonal grooves parallel to the inner edges of said upwardly extending members, a pair of clamping plates provided with clamping jaws, guide-plates for slidably supporting said clamping plates, a link-plate connected with said clamping plates and adapted to operatively engage with the respective diagonal grooves of said upwardly extending members, a nut-piece secured to said vertically movable plate, a downwardly extending rod adjustably connected with said nut-piece, a cam-like member connected with a driving shaft, said cam-like member being adapted to engage said rod to move upwardly said vertically movable plate, a pair of downwardly depending arms connected with said vertically movable plate, a weight connected with the lower ends of said arms, said weight being adapted to lower the vertically movable plate, a pair of swinging guide-members arranged above said clamping plates, said guide-members being adapted to guide a button-blank between the said clamping jaws of said clamping plates, a chute-plate arranged in connection with said guide-members, said chute-plate being provided with a spring-like member provided at its lower end with a tongue adapted to engage the back of said button-blank, a bridge-piece connected with one of the guide-plates over said clamping plates, an adjusting screw carried by said bridge-piece for adjusting the position of said spring-like member and its tongue, a stop-lug adjustably connected with either of said guide-plates over said clamping plates, said stop-lug having an inwardly projecting fingerpiece which serves to stop and support said button-blank between the clamping jaws and said clamping plates, a cross-bar pivotally supported between the posts of said supporting plate, an upwardly extending member connected with said cross bar, a chuck-plate carried by said upwardly extending member, said chuck-plate being provided with an opening for the passage of drills therethrough, and means for oscillating said cross-bar to move said chuck-plate in and out of its co-operative holding relation with said clamping-plates, substantially as and for the purposes set forth.

12. In a clamping chuck for button-blank drilling machinery, the combination with a supporting plate and posts for carrying the same, of a vertically movable plate, guide-plates connected with said supporting plate for slidably supporting said vertically movable plate, a pair of upwardly extending members connected with said vertically movable plate, said upwardly extending members being provided with diagonal grooves parallel to the inner edges of said upwardly extending members, a pair of clamping plates provided with clamping jaws, guide-plates for slidably supporting said clamping plates, a link-plate connected with said clamping plates and adapted to operatively engage with the respective diagonal grooves of said upwardly extending members, a nut-piece secured to said vertically movable plate, a downwardly extending rod adjustably connected with said nut-piece, a cam-like member connected with a driving shaft, said cam-like member being adapted to engage said rod to move upwardly said vertically movable plate, a pair of downwardly depending arms connected with said vertically movable plate, a weight connected with the lower ends of said arms, said weight being adapted to lower the vertically movable plate, a pair of swinging guide-members arranged above said clamping plates, said guide-members being adapted to guide a button-blank between the said clamping jaws of said clamping plates, a chute-plate arranged in connection with said guide-members, said chute-plate being provided with a spring-like member provided at its lower end with a tongue adapted to engage the back of said button-blank, a bridge-piece connected with one of the guide-plates over said clamping plates, an adjusting screw carried by said bridge-piece for adjusting the position of said spring-like member and its tongue, a stop-lug adjustably connected with either of said guide-plates over said clamping plates, said stop-lug having an inwardly projecting fingerpiece which serves to stop and support said button-blank between the clamping jaws and said clamping plates, a cross-bar pivotally supported between the posts of said supporting plate, an upwardly extending member connected with said cross-bar, a chuck-plate carried by said upwardly extending member, said chuck-plate being provided with an opening for the passage of drills therethrough, and means for oscillating said cross-bar to move said chuck-plate in and out of its coöperative holding relation with said clamping-plates, comprising a cam-like member provided with a cam-groove, a downwardly extending arm connected with said cross-bar, and a roller journaled upon the lower end of said arm and adapted to be engaged by said cam-groove of said cam-like member, substantially as and for the purposes set forth.

13. In a clamping chuck for button-blank drilling machinery, the combination with a supporting plate and posts for carrying the same, of a vertically movable plate provided with a pair of oppositely extending diagonal grooves, a pair of clamping plates, guide-plates for slidably supporting said clamping plates, clamping jaws connected with the inner ends of said clamping plates, link-plates connected respectively with the outer ends of said clamping plates, said link-plates being provided with a projection adapted to enter or dovetail said diagonal grooves of said vertically movable plate, so that a vertical movement of the said vertically movable plate will cause a lateral movement of said clamping plates upward and away from each other, a pivotally mounted chuck-plate adapted to coact with said clamping plates and their clamping jaws for holding a button-blank, and means for oscillating said chuck-plate to cause the same to move in and out of its operative holding position, substantially as and for the purposes set forth.

14. In a clamping chuck for button-blank drilling machinery, the combination with a supporting plate and posts for carrying the same, of a vertically movable plate provided with a pair of oppositely extending diagonal grooves, a pair of clamping plates, guide-plates for slidably supporting said clamping plates, clamping jaws connected with the inner ends of said clamping plates, link-plates connected respectively with the outer ends of said clamping plates, said link-plates being provided with a projection adapted to enter or dovetail said diagonal grooves of said vertically movable plate, so that a vertical movement of the said vertically movable plate will cause a lateral movement of said clamping plates upward and away from each other, a cross-bar pivotally supported between the posts of said supporting plate, an upwardly extending member connected with said cross-bar, a chuck-plate carried by said upwardly extending member, said chuck-plate being provided with an opening for the passage of drills therethrough, and means for oscillating said cross-bar to move said chuck-plate in and out of its coöperative holding relation with said clamping plates, substantially as and for the purposes set forth.

15. In a clamping chuck for button-blank drilling machinery, the combination with a supporting plate and posts for carrying the same, of a vertically movable plate provided with a pair of oppositely extending diagonal grooves, a pair of clamping plates, guide-plates for slidably supporting said clamping plates, clamping jaws connected with the inner ends of said clamping plates, link-plates connected respectively with the outer ends of said clamping plates, said link-plates being provided with a projection adapted to enter or dovetail said diagonal grooves of said vertically movable plate, so that a vertical movement of the said vertically movable plate will cause a lateral movement of said clamping plates upward and away from each other, a cross-bar pivotally supported between the posts of said supporting plate, an upwardly extending member connected with said cross-bar, a chuck-plate carried by said upwardly extending member, said chuck-plate being provided with an opening for the passage of drills therethrough, and means for oscillating said cross-bar to move said chuck-plate in and out of its coöperative holding relation with said clamping plates, comprising a cam-like member provided with a cam-groove, a downwardly extending arm connected with said cross-bar, and a roller journaled upon the lower end of said arm and adapted to be engaged by said cam-groove of said cam-like member, substantially as and for the purposes set forth.

In testimony, that I claim the invention set forth above I have hereunto set my hand this 29th day of July, 1910.

HERBERT J. SKIPP.

Witnesses:
FREDK. C. FRAENTZEL,
FREDK. H. W. FRAENTZEL.